Nov. 3, 1925.  1,559,885

W. E. KELLEY

GEAR REMOVER AND REPLACER

Filed April 11, 1924

Inventor
Walter E. Kelley.

Attorney

Patented Nov. 3, 1925.

1,559,885

UNITED STATES PATENT OFFICE.

WALTER E. KELLEY, OF MILLBRIDGE, MAINE.

GEAR REMOVER AND REPLACER.

Application filed April 11, 1924. Serial No. 705,856.

*To all whom it may concern:*

Be it known that I, WALTER E. KELLEY, a citizen of the United States, residing at Millbridge, in the county of Washington, State of Maine, have invented certain new and useful Improvements in Gear Removers and Replacers; and I do hereby declare the following to be a full, clear, and exact description of the invention, such as will enable others skilled in the art to which it appertains to make and use the same.

This invention relates to new and useful improvements in pulling devices, and particularly to devices for pulling gears, or the like, from shafts.

One object of the invention is to provide a device of this character which is capable of pulling the main drive gear from the rear axle of an automobile.

Another object is to provide a device of this character by means of which the gear may be pushed backwardly on the shaft, to permit the removal of the retaining rings.

A further object is to provide a device of this character by means of which the act of moving the gear to permit removal of the retaining rings can be accomplished, and the act of pulling the gear from the shaft performed thereafter, without removing the device from the shaft.

Other objects and advantages will be apparent from the following description when taken in connection with the accompanying drawing.

Figure 1:
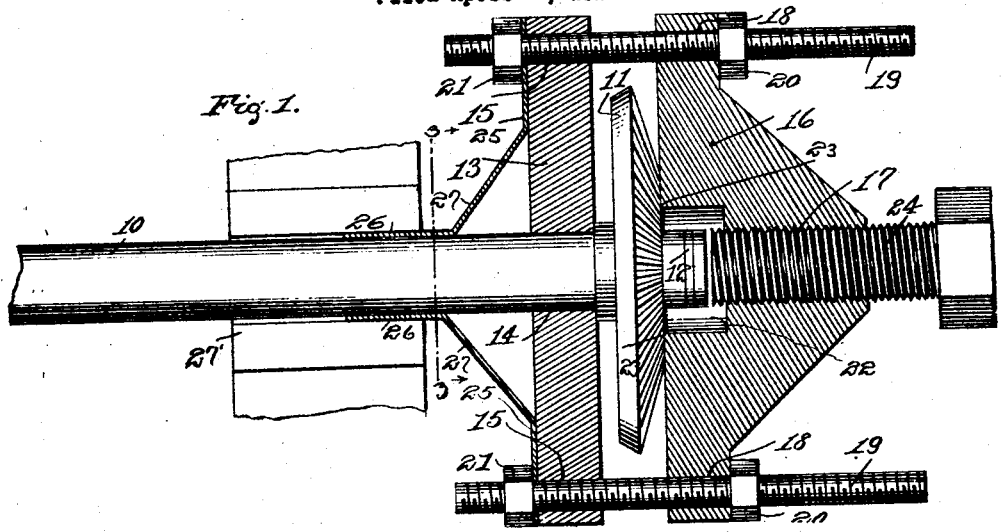
Figure 1 is an elevation, partly in section, of the device in the position assumed when moving the gear to permit removal of the retaining rings from the shaft.
Figure 2:
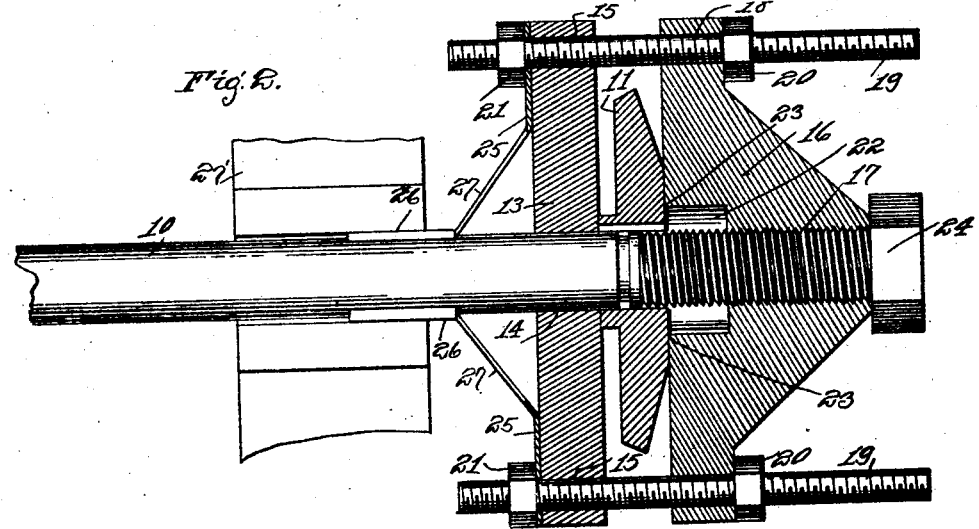
Figure 2 is a similar view showing the device in position to pull the gear from the shaft.
Figure 3:
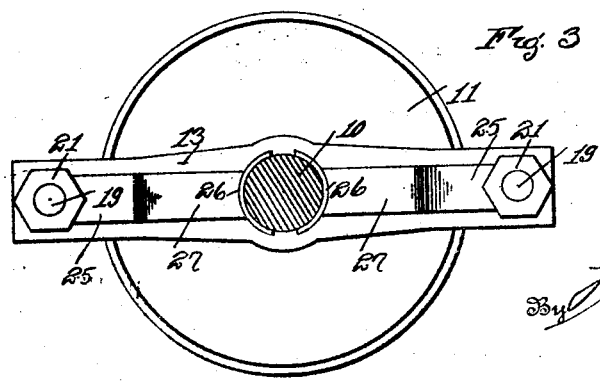
Figure 3 is a transverse sectional view on the line 3—3 of Figure 1, looking in the direction of the arrows.

Referring particularly to the accompanying drawing, 10 represents a portion of the rear axle of an automobile, 11 the gear thereon, and 12 the retaining rings.

A bar 13, having a central opening 14 for the reception of the axle 10, and the openings 15, adjacent the ends, is slipped onto the axle until it is against the inner side of the gear 11. Spaced outwardly of the bar 13 is a second bar 16, disposed in parallel relation to the first bar, and having a large central opening 17, which is threaded, and the unthreaded openings 18 adjacent the ends, these latter openings being arranged in alinement with the openings 15, to receive slidably therethrough the adjacent threaded ends of the bolts 19. The other ends of the bolts 19 are slidably disposed through the openings 15, of the bar 13. Nuts 20 are engaged on the bolts 19, outwardly of the bar 16, while nuts 21 are engaged on the other ends of the bolts, outwardly of the bar 13. In the intermediate portion of the inner face of the bar 16 there is formed a recess 22, of a size to receive the adjacent end of the axle 10, while the shoulders 23, of the recess, rest on the outer face of the gear 11. Disposed through the large opening 17 is a pressure screw 24, which is arranged to be driven against the adjacent end of the axle 10.

Engaged on the lower end of each of the bolts 19, and between the bar 13 and a nut 21, is the apertured end of a metal plate 25, said plate having its other end slightly widened and transversely curved, as shown at 26, to partially embrace the axle 10, said curved portion being connected with the apertured end by an obliquely extending portion 27.

In the use of the device, it is necessary to remove the retaining rings 12, from the axle, and to do this requires the backward movement of the gear 11, on the axle, in a direction toward the bar 13. The axle is slipped through the central opening 14, of the bar 13, so that the gear 11 is spaced a short distance from the bar, and then the axle and curved portions 26 of the plates 25, are clamped between the jaws 27' of a vise. This holds the axle from slipping through the opening 14, and at the same time prevents rotation of the tool on the axle. The bar 16 is then moved down until the shoulders 23 press against the adjacent face of the gear 11, when the nuts 20 are turned to force the bar 16 and the gear 11 longitudinally on the axle, in the direction of the bar 13. After the rings 12 have been removed, and without changing the positions of the parts, except that the axle and plates 25 are removed from the vise, and the axle permitted to slip backwardly so that the gear will rest on the bar 13, the pressure screw 24 is turned against the adjacent end of the axle, with the result that the bar 13 will pull the gear from the axle, and the screw act to push the axle through the gear.

From the foregoing it will be seen that there has been provided a simple and efficient device by means of which the successive operations of backing the gear of an automobile axle, to permit the removal of the retaining rings, and then subsequently pulling the gear from the axle, without removing the device from its operative relation to the axle and gear, can be accomplished. Also, the parts are simple in construction, and the device can be easily and conveniently handled by one person, thus reducing the cost and labor of removing the gear.

What is claimed is:

1. A gear removing device including means for supporting a shaft, means for maintaining the shaft from movement relative to the supporting means, means for moving a gear longitudinally of the shaft in one direction, said support being adapted to engage the gear, and means on the third-named means for moving engagement with the shaft.

2. A gear removing device including a shaft supporting bar, means associated with the bar for maintaining a shaft and its gear in a predetermined relation to the bar, a second bar movable toward the first bar and arranged to move the gear longitudinally of the shaft and toward the first bar, and means on the second bar and cooperating with the supporting bar for withdrawing the gear from the shaft.

3. A gear removing device including a pair of members movable toward and away from each other, one of the members being arranged to receive a shaft therethrough, means on the latter member for holding the shaft against movement relative to the member, means connecting the members and operable to move the other member into moving engagement with the gear in one direction on the shaft, and means on the last-mentioned member and engageable with the shaft for moving the shaft through the gear, the first member being arranged to engage in moving relation to the gear.

In testimony whereof, I affix my signature.

WALTER E. KELLEY.